United States Patent

Pittman et al.

[15] 3,639,156
[45] Feb. 1, 1972

[54] SILOXANE POLYMERS FOR SOIL-REPELLENT AND SOIL-RELEASE TEXTILE FINISHES

[72] Inventors: Allen G. Pittman, El Cerrito; William L. Wasley, Berkeley, both of Calif.

[73] Assignee: The United States of America as represented by the Secretary of Agriculture

[22] Filed: May 19, 1970

[21] Appl. No.: 38,899

[52] U.S. Cl.................117/139.5 A, 117/121, 117/138.8 A, 117/141, 117/143 A, 260/46.5 R, 260/448.2 B
[51] Int. Cl. ..........................................D06m 15/66
[58] Field of Search......117/139.5 A, 161 ZA, 121, 138.8 A, 117/141, 143 A; 260/46.5 R

[56] References Cited

UNITED STATES PATENTS

| | | | |
|---|---|---|---|
| 3,331,813 | 7/1967 | Pittman et al.................117/139.5 X |
| 3,420,793 | 1/1969 | Pittman et al.................117/139.5 X |

*Primary Examiner*—William D. Martin
*Assistant Examiner*—Theodore G. Davis
*Attorney*—R. Hoffman, W. Bier and W. Takacs

[57] ABSTRACT

Fluorocarbon silanes are copolymerized with silanes which contain two or more alkyleneoxy groups. The copolymers are useful for application to fibrous materials to provide both soil repellency and soil releasability.

34 Claims, No Drawings

SILOXANE POLYMERS FOR SOIL-REPELLENT AND SOIL-RELEASE TEXTILE FINISHES

A nonexclusive, irrevocable, royalty-free license in the invention herein described, throughout the world for all purposes of the United States Government, with the power to grant sublicenses for such purposes, is hereby granted to the Government of the United States of America.

This invention relates to and has among its objects the provision of novel polymers which are particularly useful for imparting soil-repellent and soil-release properties to fibrous materials. The objects of the invention also include procedures for treating fibrous materials with the polymers, and the treated materials as new articles of manufacture. Further objects of the invention will be evident from the following description wherein parts and percentages are by weight unless otherwise specified.

It is not generally realized that maintaining textiles in a clean state involves two different properties of the textile. One is soil repellency, that is, the ability of the textile to resist staining when it is contacted with gravy, butter, grease, or other oily substances. The other is soil releasability. Assuming that a textile has become stained, this property concerns the ease or difficulty of washing out the stains. The soil-repellency and soil-releasability characteristics of a given textile depend on the kind of fiber from which it is made and the kind of finishing agent which has been applied to it. Natural fibers such as cotton and wool exhibit little soil repellency, but on the other hand when they do become soiled they are readily cleaned, that is, they exhibit a high level of soil releasability. Some of the synthetics, notably polyesters, not only exhibit a low level of soil repellency but also a low level of soil releasability. Thus, the modern trend toward fabricating textiles from blends of cotton or wool with polyesters has aggravated the situation because such blends are easily soiled and the absorbed soil is difficult to wash out. The application of resins for providing durable press properties still further aggravates the soil release situation. Almost everyone has encountered a situation where a so-called wash-and-wear garment of resin-treated cotton/polyester or wool/polyester blended material has become soiled by contact with an oily substance, and it is found that it takes repeated washings to remove the stains. In efforts to circumvent these problems, fluorocarbon polymers have been applied to the textiles. Because of the oleophobic properties of most fluorocarbons, such treatments do enhance the soil repellency of the fabric. However, they tend to make the soil release properties even worse because the aqueous washing medium cannot properly wet the fabric, hence cannot remove stains. Another remedy has been to apply hydrophilic materials, generally polymeric, to the textiles. These generally make it easier to wash out stains, but they do not enhance the ability of the textile to resist staining when contacted with oily substances.

A particular object of the invention is to provide the means for alleviating the problems outlined above. The invention provides polymers which confer oil repellence on fabrics so that they strongly resist staining, e.g., by oily foods or the like. Concomitantly, these polymers confer soil release properties on the fabric to which they are applied. This means that if the fabric does become stained, the stains can be readily washed out. Another advantage is that these polymers confer antistatic properties on the fabric to which they are applied.

The polymers having this desirable combination of properties are copolymerization products of at least two different monomers, one imparting oleophobic properties, the other hydrophilic properties. More specifically, the oleophobic monomer is a silane which contains a terminal perfluoroalkyl group of three to 18 perfluorinated carbon atoms, such group being hereinafter designated as $R_f$. The hydrophilic monomer is a silane which contains two or more groups of the structure —Alk—O— wherein Alk is an alkylene group containing two to six carbon atoms. The resulting siloxane copolymers have a silicon-to-oxygen backbone, plus pendant $R_f$ groups which provide oleophobicity, and groups of the structure —Alk—O— which provide hydrophilicity. The monomers are described further in the following paragraphs.

THE OLEOPHOBIC MONOMER

Generically, the oleophobic monomer used in accordance with the invention has the structure I.
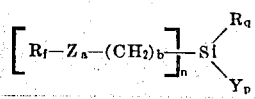

wherein:

$R_f$ is a perfluoroalkyl group containing three to 18 perfluorinated carbon atoms. This perfluoroalkyl group can be of an open-chain (acyclic) configuration, straight or branched. Alternatively, it may be of a cyclic structure such as a perfluorocyclohexyl group, or it may be a combination of acyclic and cyclic structures. Generally, the acyclic structures are preferred.

Z is a divalent bridging group linked to a carbon of $R_f$ and a carbon of $(CH_2)_b$, such as an ester ($-CO_2-$ or $-SO_3-$), an ether ($-O-$, $-(CH_2)_s-O-$, or $-S-$), an amine ($-(CH_2)_s-NR'-$), or an amide ($-CONR'-$ or $-SO_2NR'-$) group, wherein $s$ is an integer from one to six and $R'$ is hydrogen or a lower alkyl radical.

R is a member of the group consisting of hydrogen, monovalent hydrocarbon radicals, and monovalent halohydrocarbon radicals. Examples of R are hydrogen; an alkyl radical such as methyl, ethyl, isopropyl, butyl, cyclohexyl, dodecyl, etc.; an aryl radical such as phenyl, tolyl, ethylphenyl, isopropylphenyl, xylyl, xenyl, naphthyl, etc.; an aralkyl radical such as benzyl or 2-phenylethyl; or a halogenated hydrocarbon radical such as 2-chloroethyl, trifluoromethyl, 3-chloropropyl, 2,2,2-trifluoroethyl, 4-chloro- (or fluoro-) cyclohexyl, p-chloro- (or bromo- or fluoro-) phenyl, and the like.

Y is a member of the group consisting of halogen, alkoxy, aroxy, and acyloxy. For example, Y may be a halogen such as fluorine, chlorine, bromine, or iodine; an alkoxy radical such as methoxy, ethoxy, propoxy, isopropoxy, butoxy, cyclohexyloxy, or the like; an aroxy radical such as phenoxy, toloxy, ethylphenoxy, isopropylphenoxy, or the like, or an acyloxy radical such as acetoxy, propionoxy, butyroxy, or the like.

$a$ is an integer from 0 to 1.
$b$ is an integer from 1 to 12.
$n$ is an integer from 1 to 2.
$p$ is an integer from 1 to 3.
$q$ is an integer from 0 to 2, and the sum of $n$, $p$, and $q$ is 4.

In the preferred compounds there is more than one hydrolyzable group (Y), i.e., $p$ has the value 2 or 3.

These monomers are known in the art and described in the literature, for example, in U.S. Pat. Nos. 3,012,006, 3,422,131, and 3,423,234. Examples of individual monomers are given below by way of illustration, not limitation:

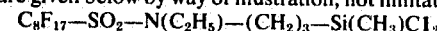
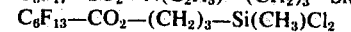
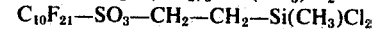
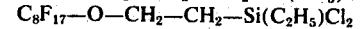
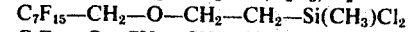
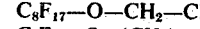
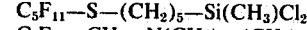
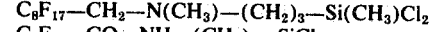
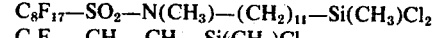
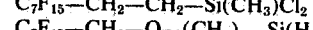
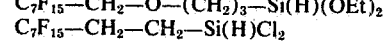
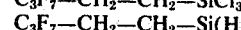
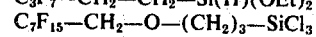

Of particular interest are the monomers wherein $R_f$ is of the heptafluoroisopropyl radical since this group provides a degree of oleophobicity equivalent to six or seven fluorinated carbons in a straight chain. Monomers of this category are disclosed in our U.S. Pat. No. 3,422,131 and include compounds of the structure II.
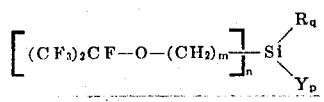

wherein:
$m$ is an integer from 2 to 3, and the other symbols are as in formula I, namely:
R is a member of the group consisting of hydrogen, monovalent hydrocarbon radicals, and monovalent halohydrocarbon radicals.
Y is a member of the group consisting of halogen, alkoxy, aroxy, and acyloxy.
$n$ is an integer from 1 to 2.
$p$ is an integer from 1 to 3.
$q$ is an integer from 0 to 2, and the sum of $n$, $p$, and $q$ is 4.
Examples of individual monomers in this subcategory are listed below by way of illustration, not limitation:
$(CF_3)_2CF—O—(CH_2)_3—SiCl_3$
$(CF_3)_2CF—O—(CH_2)_3—Si(CH_3)Cl_2$
$(CF_3)_2CF—O—CH_2—CH_2—SiCl_3$
$(CF_3)_2CF—O—CH_2—CH_2—Si(CH_3)Cl_2$
$[(CF_3)_2CF—O—CH_2—CH_2—CH_2]_2—SiCl_2$
$(CF_3)_2CF—O—CH_2—CH_2—CH_2—Si(OCH_3)_3$
$(CF_3)_2CF—O—CH_2—CH_2—CH_2—Si(CH_3)(OEt)_2$

THE HYDROPHILIC MONOMER

One category of hydrophilic monomers used in accordance with the invention has the structure III.
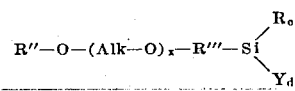

wherein:
R″ is a monovalent hydrocarbon radical containing one to 20 carbon atoms and which may be in an alkyl, aryl, or aralkyl configuration. The nature of the hydrocarbon substituent R″ is of no criticality; it simply serves as an inert terminator of the alkyleneoxy chain.
Alk is an alkylene group containing two to six carbon atoms.
$x$ is an integer from two to 100.
R‴ is a divalent linking radical selected from the group consisting of $—CH_2—CH_2—CH_2—$, $—CH_2—CH(CH_3)—CH_2$, $—CO—CH(CH_3)—$, and $—CO—C(CH_3)_2—$.
$c$ is an integer from 0 to 2.
$d$ is an integer from 1 to 3, and the sum of $c$ and $d$ is 3.
The remaining symbols R and Y are as in formula I, namely:
R is a member of the group consisting of hydrogen, monovalent hydrocarbon radicals, and monovalent halohydrocarbon radicals.
Y is a member of the group consisting of halogen, alkoxy, aroxy, and acyloxy.
In the preferred monomers, there is more than one hydrolyzable group (Y), that is, $d$ has the value two or three.
The aforesaid hydrophilic monomers may be readily prepared by conventional methods. A typical procedure is to start with a monoetherified polyalkyleneoxy glycol
$$R''—O—(Alk—O)_x—H$$
and convert this into the corresponding allyl (or methallyl) ether by reaction with allyl (or methallyl) bromide in the presence of a base. This intermediate is then reacted with a silane containing hydrogen attached to the silicon atom, for example, trichlorosilane, dichlorosilane, methyl dichlorosilane, or other silane of the formula

wherein R, Y, $c$, and $d$ are as above defined. The reaction is generally carried out in the presence of a catalyst such as chloroplatinic acid and results in addition of the silane to the unsaturated group of the allyl (or methallyl) ether. The synthesis is illustrated by the following equations:

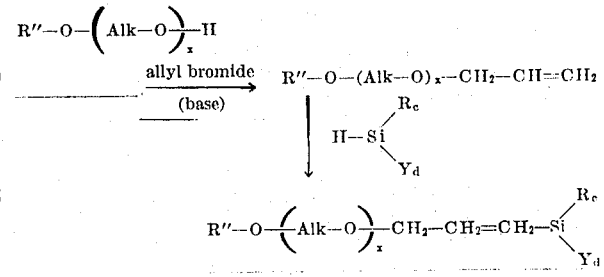

In the event that a methallyl halide is used in the first step, the final product is

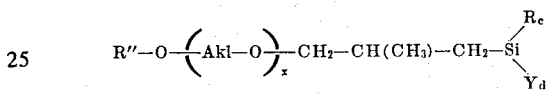

Where it is desired to produce monomers containing an ester linkage (i.e., where R‴ is $—CO—CH(CH_3)—$ or $—CO—C(CH_3)_2—$), the synthesis is varied in the first step by esterifying the monoetherified polyethyleneoxy glycol
$$R''—O—(Alk—O)_x—H$$
with acryloyl (or methacryloyl) chloride. In the next step, a hydrogen-containing silane is added to the intermediate as previously described. The synthesis is illustrated by the following formulas:

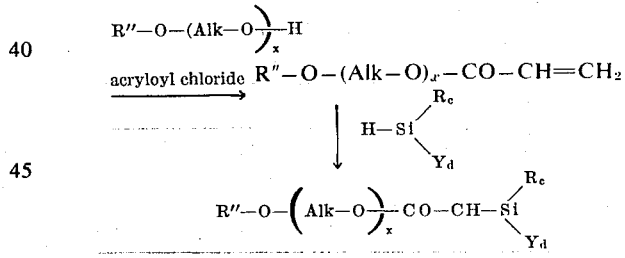

In the event the esterification is carried out with a methacrylic acid derivative, the final product is

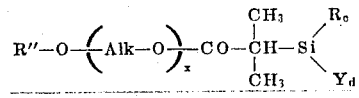

Examples of individual monomers are provided below by way of illustration:
$CH_3—O—(CH_2—CH_2—O)_2—(CH_2)_3—SiCl_3$

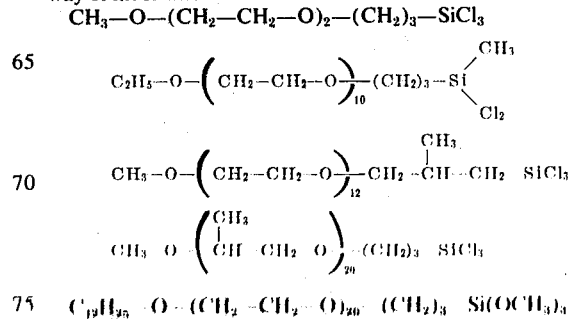

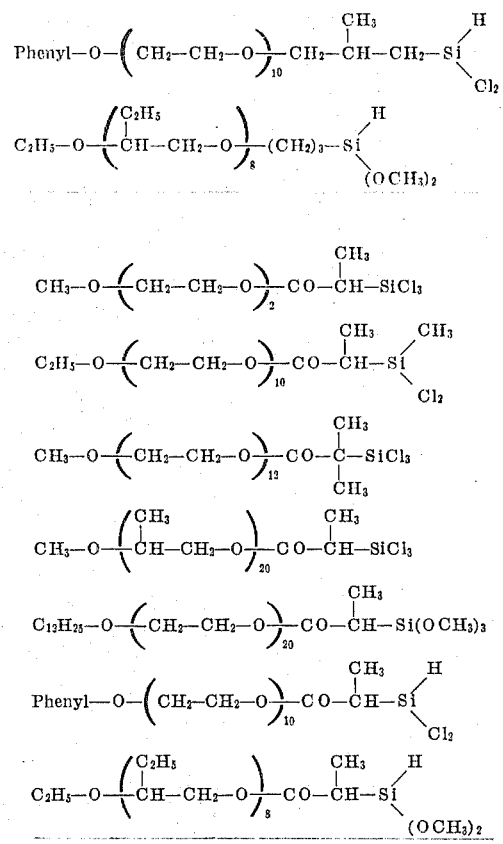

Another category of hydrophilic monomers used in accordance with the invention contains two silyl groups, and has the structure IV. 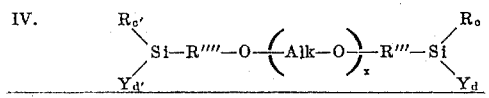

wherein R, Y, R''', Alk, x, c, and d are as defined in formula III: $c'$ is an integer from 0 to 2, $d'$ is an integer from 1 to 3, and the sum of $c'$ and $d'$ is 3. R'''' is analogous to R''' in that it is a member of the group consisting of —CH$_2$—CH$_2$—CH$_2$—, —CH$_2$—CH(CH$_3$)—CH$_2$—, —(CH$_3$)CH—CO—, and —(CH$_3$)$_2$—CO—.

In preparing the compounds shown in formula IV the same procedures are applied as aforesaid except that the starting material is a polyoxyalkylene glycol containing two terminal hydroxyls. The synthesis is illustrated as follows:

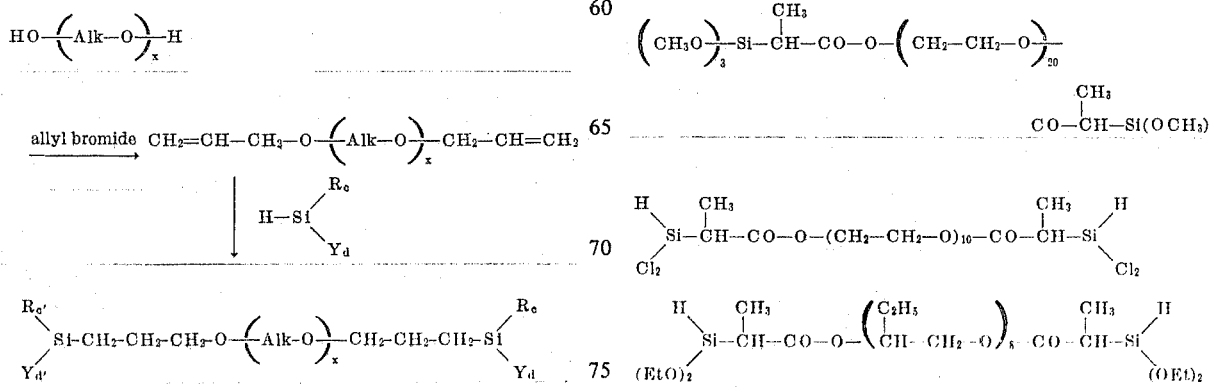

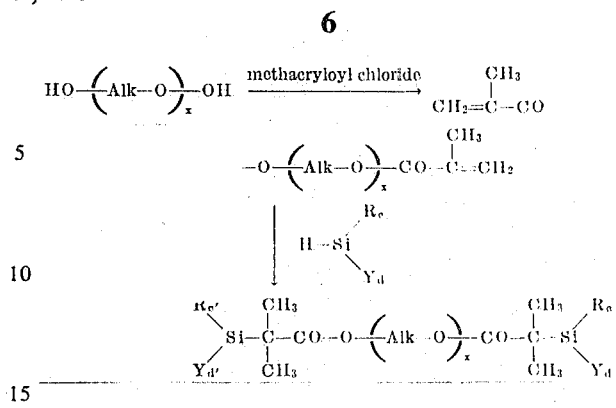

Examples of individual monomers are provided below by way of illustration:

$Cl_3Si—(CH_2)_3—O—(CH_2—CH_2—O)_2—(CH_2)_3SiCl_3$

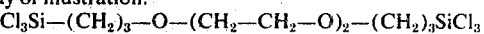

$Cl_3Si—CH_2—CH(CH_3)—CH_2—O—(CH_2—CH_2—O)_{12}—CH_2—CH(CH_3)—CH_2—SiCl_3$

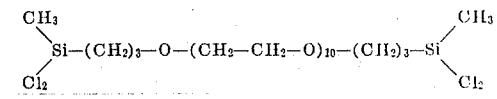

$(CH_3O)_3Si—(CH_2)_3—O—(CH_2—CH_2—O)_{20}—(CH_2)_3—Si(OCH_3)_3$

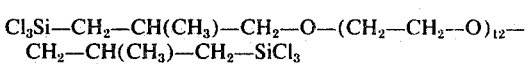

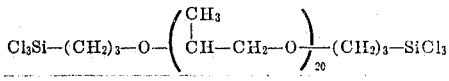

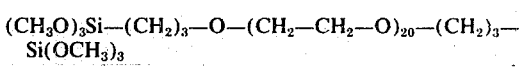

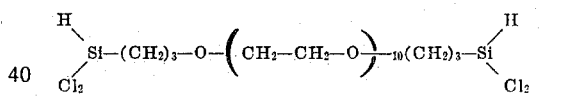

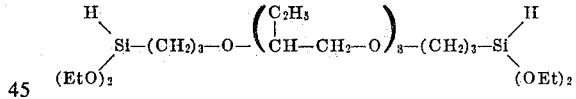

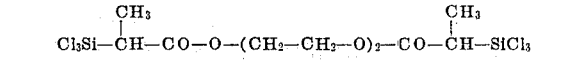

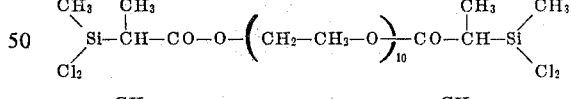

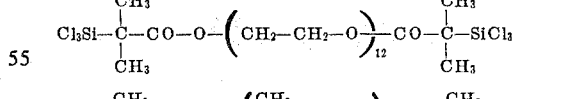

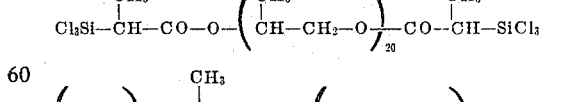

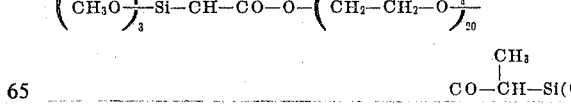

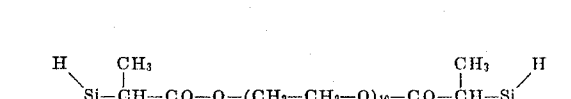

Many of the polyoxyalkylene glycols available in commerce are mixtures of congeners with differing numbers of alkyleneoxy units. Such commercial mixtures are suitable as starting materials for the syntheses of the hydrophilic monomers (both those of formula III and formula IV). Among such mixtures are those wherein the average number of alkyleneoxy units is two, four, six, eight, 10, 12, 14, 16, 20, 24, 30, or 40, for example.

PREPARATION OF THE COPOLYMERS

The copolymers of the invention are prepared by conventional polymerizations used in preparing siloxane polymers. This involves subjecting a mixture of the oleophobic and hydrophilic monomers to hydrolysis. For example, the monomer mixture is stirred with an excess of water, and then water and byproducts are removed by evaporation. A preferred technique involves dissolving the monomer mixture in a solvent such as acetone, p-dioxane, tetrahydrofuran, or other volatile solvent which is at least partly miscible with water, and adding water to this solution with stirring. The reaction mixture is then subjected to evaporation, preferably under vacuum, to remove solvent, water, and byproducts of the hydrolytic polymerization.

The copolymers are generally viscous liquids which are soluble in most organic solvents, particularly fluorinated solvents such as benzotrifluoride, trichlorotrifluoroethane, 1,3-bis-trifluoromethylbenzene, and the like. These polymer solutions are useful for treating fibrous materials to provide them with both soil repellency and soil releasability.

The structure of the copolymers will vary depending on the nature of the monomers selected. For example, where the monomer of formula I is copolymerized with the monomer of formula III, the copolymer will contain repeating units of the structure

V.

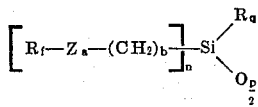

and repeating units of the structure

VI.

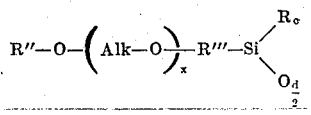

Where the hydrophilic monomer selected is according to formula IV, the copolymer will contain repeating units as shown in formula V and repeating units of the structure

VII.

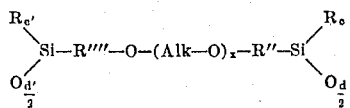

As noted hereinabove, we prefer to use monomers (both oleophobic and hydrophilic) wherein each contains at least two hydrolyzable groups per silicyl group. Such monomers yield copolymers of greater molecular weight and which are capable of further polymerization—for example, after they are applied to a fibrous material and subjected to a curing operation. The monomers containing a single hydrolyzable group are preferably used where it may be desired to limit the degree of polymerization and thus they may be used in conjunction with di- or trifunctional monomers to act as chain stoppers.

In preparing the copolymers of the invention, the proportions of the monomers may be varied depending on such factors as the number of perfluorinated carbon atoms in the oleophobic monomer, the number of alkyleneoxy groups in the hydrophilic monomer, and the properties desired in the copolymer. In general, the monomers are used in the ratio of about from 0.1 to 3 moles of the hydrophilic monomer per mole of the oleophobic monomer, with the proviso that the copolymer contain at least 10 percent fluorine by weight.

The copolymers of the invention encompass those which are prepared by copolymerization of the oleophobic and hydrophilic monomers as above described plus one or more monomers which are different from both of the basic reactants. The additional monomer may be employed to modify the mechanical properties of the copolymer without materially affecting its ability to provide soil repellency and soil releasability, or to increase the adherence of the copolymer to fibrous substrates. Typically, the additional monomer may di- or trifunctional silanes such as methyldichlorosilane, dimethyldichlorosilane, methyltrichlorosilane, trichlorosilane, phenyldichlorosilane, trimethoxysilane, or the like.

TREATMENT OF FIBROUS SUBSTRATES

The copolymers described herein are particularly useful for the treatment of fibrous materials, such as textiles, to provide them with oil, water, and soil repellency and further to improve their soil or stain release characteristics. In practicing this phase of the invention, a copolymer is prepared as described above and applied to the fibrous substrate. Typically, the copolymer is dispersed in a liquid carrier and in this form applied to the fibrous material. The term "dispersion" is used in a generic sense to include solutions, suspensions, and emulsions. Where the copolymer is to be applied in the form of a solution, it is dissolved in an inert volatile solvent, e.g., benzotrifluoride, 1,3-bis-trifluoromethyl benzene, or trichlorotrifluoroethane. Alternatively, the copolymer is emulsified in water, with the aid of a conventional emulsifying agent. In any event, the resulting dispersion is applied to the fibrous material by a conventional dip and pad technique. By varying the concentration of the copolymer in the dispersion and the degree of padding, the amount of copolymer deposited on the material may be varied. Typically, the amount of copolymer may be from 0.1 to 20 percent, based on the weight of fibrous material but it is obvious that higher or lower proportions can be used if desired. Usually, in treating textiles such as fabrics, the amount of copolymer is limited to about 0.1 to 5 percent to attain the desired repellency without interference with the hand of the textile.

After application of the copolymer dispersion, the treated fibrous substrate is subjected to a conventional curing operation in order to bond the polymer to the fibers. As an example of such treatment, the fibrous material is heated in the range of about 50° to 150° C. for a period of 5 to 60 minutes. The solvent (from the copolymer dispersion) may be evaporated in a separate step prior to curing or it may simply be evaporated during the curing operation. In this curing operation. In this curing operation the uncondensed or unhydrolyzed groups in the uncured copolymer (e.g., halo, alkoxy, or aroxy groups attached to Si) react with reactive sites in the fibers, particularly sites which contain active hydrogen as in hydroxyl, primary and secondary amide, thiol, carboxyl, and like groups. Many types of fibers—for example: wool, silk, hair, and other proteinous fibers; cotton, rayons, and other cellulosic fibers; nylon, polyurethane, and polyurea fibers—contain groups of this kind and therefore are particularly suitable substrates to obtain good bonding the copolymer deposit. Moreover, virtually all fibrous materials, even inorganic products such as asbestos and glass fibers, contain moisture and during the curing operation this moisture promotes additional hydrolysis and condensation of unreacted Si-bonded halo, alkoxy, or aroxy groups with the end result that additional, in situ, polymerization occurs so that the copolymer is durably fixed to the treated substrates.

If it is desired to expedite the curing operation, a conventional curing catalyst may be added to the polymer solution before application to the fibrous substrate or the catalyst may be separately deposited on the substrate before or after application of the copolymer dispersion. Typically, one may use such catalysts as zinc octoate, dibutyltin diacetate or dilaurate, triethanolamine titanate, triethanolamine zirconate, zirconium acetate, zirconium oxychloride, zirconium or titanium esters of alkanols such as tetrabutyl titanate, zinc perfluorobutyrate, etc.

Fibrous materials treated with the copolymers of the invention display an enhanced resistance to becoming soiled and if they do become stained they can be readily cleaned. Moreover, these advantages are attained without detriment to other properties of the textile. In particular, the treatment does not impair the hand of the textile. In fact, the hand is usually improved in that the textile is softer and more supple. Another point is that the improvements rendered by the process are durable—they are retained despite laundering and drycleaning of the product.

The invention may be utilized for improving the properties of all types of fibrous materials, for example, paper; cotton; linen; hemp; jute; ramie; sisal; cellulose acetate rayons; cellulose acetate-butyrate rayons; saponified acetate rayons; viscose rayons; cuprammonium rayons; ethyl cellulose; fibers prepared from amylose, algins, or pectins; wool; silk; animal hair; mohair; leather; fur; regenerated protein fibers prepared from casein, soybean, peanut proteins, zein, gluten, egg albumin, collagen, or keratins; nylon; polyurethane fibers; polyester fibers such as polyethylene terephthalate; polyacrylonitrile-based fibers; or fibers of inorganic origin such as asbestos, glass, etc. The invention may be applied to textile materials which are in the form of bulk fibers, filaments, yarns, threads, slivers, roving, top, webbing, cord, tape, woven or knitted fabrics, felts or other nonwoven fabrics, garments of garment parts.

EXAMPLES

The invention is further demonstrated by the following examples which are provided by way of illustration, not limitation.

Test Methods

The tests referred to in the examples were carried out as described below:

Oil Repellency:

The test used was the AATCC Test Method 118-1966T. Ratings are from zero to eight with the higher values signifying the greater resistance to oil penetration. In particular, the oil-repellency rating is the highest-numbered test liquid which will not wet the fabric in within a period of 30 seconds. The liquids and their corresponding numbers are:

| No. | Composition |
|---|---|
| 1 | Nujol |
| 2 | 65:35 Nujol and n-hexadecane, by vol. |
| 3 | n-hexadecane |
| 4 | n-tetradecane |
| 5 | n-dodecane |
| 6 | n-decane |
| 7 | n-octane |
| 8 | n-heptane |

Stain Release:

Samples of the fabrics are stained with mineral oil, then washed and rated for stain release according to AATCC Test Method 130-1969. Residual stain is rated on a scale from five to one by comparison with a standard stain release replica which displays a graduated series of stains. The highest number (5) indicates complete stain removal, whereas the lowest (1) indicates virtually no stain removal.

The following oleophobic monomers were prepared by known methods:

| Monomer | Code designation | Preparation |
|---|---|---|
| $(CF_3)_2CF-O-(CH_2)_3-SiCl_3$ | A | Pat. 3,422,131 |
| $(CF_3)_2CF-O-(CH_2)_3-\underset{\underset{CH_3}{\|}}{Si}Cl_2$ | B | Do. |
| $CF_3-(CF_2)_6-CH_2-O-(CH_2)_3-SiCl_3$ | C | Pat. 3,012,006 |

The following hydrophillic monomers were prepared as described in examples 1–5:

| Monomer | Code designation | Preparation |
|---|---|---|
| $CH_3-O-CH_2-CH_2-O-CH_2-CH_2-O-(CH_2)_3-SiCl_3$ | D | Ex. 1. |
| $CH_3-O-(CH_2-CH_2-O)_g-(CH_2)_3-SiCl_3$ (wherein $g$ is approximately 12) | E | Ex. 2. |
| $Cl_3Si-(CH_2)_3-O-(CH_2-CH_2-O)_3-(CH_2)_3-SiCl_3$ | F | Ex. 3. |
| $\text{(phenyl)}-O-(CH_2-CH_2-O)_g-CH_2-\underset{\underset{CH_3}{\|}}{CH}-CH_2-\underset{\underset{CH_3}{\|}}{Si}Cl_2$ with $C_9H_{19}$ substituent (wherein $g$ is approximately 12) | G | Ex. 4. |
| $CH_3-O-(CH_2-CH_2-O)_2-\overset{\overset{O}{\|}}{C}-\underset{\underset{CH_3}{\|}}{CH}-SiCl_3$ | H | Ex. 5. |

EXAMPLE 1—PREPARATION OF MONOMER D

The following reaction scheme was carried out in the preparation of monomer D:

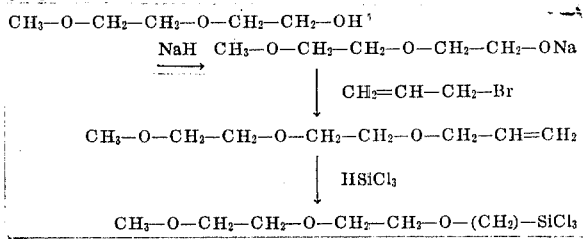

Into a dry 1-liter, 3-necked flask, equipped with a stirrer, $N_2$ inlet, dropping funnel and condenser, was placed 200 ml. of dry p-dioxane and 48 g. of 50 percent active sodium hydride (1 mole NaH) dispersed in mineral oil. To this was added slowly, under $N_2$, 120 g. (1 mole) of the monomethyl ether of diethylene glycol.

Following this, 1 mole of allyl bromide, diluted with 100 ml. of p-dioxane, was added dropwise with stirring. The flask was cooled with ice water during the addition as considerable heat was evolved. Sodium bromide was seen to precipitate from the mixture during the addition. After all the allyl bromide had been added, the reaction mixture was stirred overnight at room temperature. The reaction mixture was then filtered free from NaBr (111 g. solid obtained), and the filtrate treated by first distilling off the dioxane at about 100° C. at atmospheric pressure and then distilling the product under vacuum. Seventy-eight grams of the allyl ether were obtained by distillation at about 73° C. at 5 mm. Hg pressure.

Monomer D was then prepared from the allyl ether as follows: Three small, dry, Pyrex tubes sealed at one end were each charged with 2.8 g. of the allyl ether, 0.05 ml. t-butyl perbenzoate, and 3.1 ml. Cl$_3$SiH. The tubes were cooled in a dry-ice bath, evacuated, sealed, and placed in a steam bath overnight. The contents of the tubes were then combined and distilled under vacuum to yield 10.4 g. of monomer D, b.p. 115°–116° C. at approximately 1 mm. Hg.

EXAMPLE 2—PREPARATION OF MONOMER E

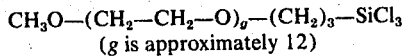

(g is approximately 12)

This monomer was prepared in a manner similar to that described in example 1, using (for the preparation of the allyl ether) the following materials:

225 g. of CH$_3$—O—(CH$_2$—CH$_2$)$_g$—OH
(wherein g is approximately 12)
21 g. of 50 percent active NaH in mineral oil
300 ml. p-dioxane (solvent)
100 g. allyl bromide (excess)

In preparing the allyl ether, the reaction mixture was heated at 80° C. for 24 hours rather than held overnight at room temperature.

In the next stage of the synthesis, the following ingredients were placed in a dry, 60ml., glass vessel:

23 g. of the allyl ether (0.04 mole)
0.15 ml. t-butyl perbenzoate
6.2 ml. Cl$_3$SiH (0.06 mole)

The vessel was sealed and placed in a steam bath overnight. Then the liquid product was heated under reduced pressure to remove unreacted trichlorosilane. About 2.5 g. of unreacted Cl$_3$SiH was collected in a dry-ice trap, indicating good product conversion. Infrared analysis of the product, Monomer E, did not show any vinyl absorption at 6.1$\mu$ but did show bands at 13.2 and 14.4$\mu$, which is typical of —SiCl$_3$ monomers.

Monomer E could be polymerized by adding it directly to water. A water-soluble product was formed which could be cured to an insoluble cross-linked rubber on removal of water and heating at 150° C. for ca. 30 minutes.

EXAMPLE 3—PREPARATION OF MONOMER F

Cl$_3$Si—(CH$_2$)—O—(CH$_2$—CH$_2$—O$_3$—(CH$_2$)$_3$—SiCl$_3$

The preparation of this monomer was similar to that of monomer D except that the di-allyl ether of triethylene glycol was first prepared and followed by the addition of 2 moles of trichlorosilane.

In preparing the di-allyl ether the following chemicals were employed:

84 g. of a 57 percent active NaH mineral oil dispersion;
200 ml. dry dimethylformamide (solvent)
158 g. of triethylene glycol dissolved in 100 ml. of dry dimethylformamide
2 moles of allyl bromide dissolved in 200 ml. of p-dioxane After addition of the allyl bromide, the slurry was heated with stirring overnight at 60° C. The salt was removed by filtration and the filtrate distilled. A crude product was obtained in a yield of 163 grams, b.p. 130°–145° C. at about 5 mm. Hg. Analysis thereof showed the desired vinyl absorption but also some residual OH which was due either to unreacted triethylene glycol or mono-allyl ether. Accordingly, the crude product was treated with increments of a high-molecular weight (MW 600) aliphatic di-isocyanate (General Mills DDI) to tie up residual OH-containing products. The di-isocyanate was added slowly, and the product checked from time to time until there was no evidence of free NCO in the product. The reaction mixture was then distilled under vacuum to give the di-allyl ether product free from OH, b.p. ca. 145° C. at 5 mm. Hg.

Addition of trichlorosilane to the diallyl ether was carried out as described in the preparation of monomers E and F, by adding 2 molar equivalents of HSiCl$_3$ to the diallyl ether in the presence of t-butyl perbenzoate catalyst.

EXAMPLE 4—PREPARATION OF MONOMER G

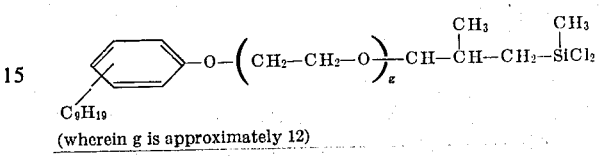

(wherein g is approximately 12)

This monomer was prepared in the same manner as described for monomers D and E except that the monohydroxy alcohol was a nonylphenoxy polyethylene glycol containing about 12—CH$_2$—CH$_2$—O—units and instead of allyl bromide, methallyl chloride was used.

Addition of methyl dichlorosilane was carried out as before, in the presence of t-butyl perbenzoate.

EXAMPLE 5—PREPARATION OF MONOMER H

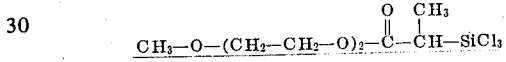

This monomer was prepared by first adding dropwise the monomethyl ether of diethylene glycol to a twofold excess of acryloyl chloride held at 40° C. A nitrogen purge was maintained throughout the addition and for a half hour after the addition had been completed. After this, excess acryloyl chloride was removed under vacuum and the acrylate distilled under vacuum to obtain an 80 percent yield, b.p. 70°–72° C. at 1.5 mm. Hg.

Trichlorosilane was added to the acrylate by heating together in a sealed tube: 0.07 mole of the acrylate, 0.2 g. of 2,6-di-t-butyl p-cresol (polymerization inhibitor), 12 ml. of HSiCl$_3$, and 0.2 ml. of a 0.00014 molar solution of H$_2$PtCl$_6$·6H$_2$O in isopropanol.

EXAMPLE 6—PREPARATION OF COPOLYMERS

Copolymers were generally prepared by the cohydrolysis of a mixture of the monomers, either by adding the mixture to water with vigorous stirring or, preferably, by first dissolving the mixture in a solvent such as acetone, p-dioxane, tetrahydrofuran or other solvent which is partially to completely miscible with water, then adding water to the monomer-solvent solution, and finally removing solvent under vacuum.

A. An example follows for the copolymerization of monomers A and D: 2 ml. of monomer A was mixed with 1 ml. of monomer D, and the mixture added to 20 ml. of tetrahydrofuran. The solution was stirred and ½ ml. of water added. After about 1 hour, the mixture was placed on a steam bath to remove solvent. Residual solvent was removed in a vacuum oven at 80° C. at 1 mm. Hg. A clear, thick, homogenous liquid remained. This siloxane copolymer was soluble in a number of organic solvents, particularly fluorinated solvents such as benzotrifluoride and trichlorotrifluoromethane.

The liquid polymer could be converted into an insoluble, rubbery solid by heating. For example, heating at 150° C. for 10 minutes converted a thin layer of the liquid into a rubbery solid. A true copolymer existed since a mixture of the homopolymer of A and the homopolymer of D were incompatible and formed two insoluble layers on mixing.

A series of copolymers were prepared as described in paragraph A above:

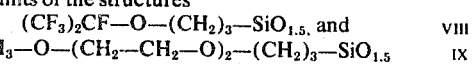

| Monomers used | Quantity of each monomer, in ml. | Polymer code designation |
| --- | --- | --- |
| A and D | 1/1 | I |
| A and D and HSiCl₃ | 2/0.5/0.5 | II |
| A and E | 2/1 | III |
| A and F | 3/1 | IV |
| B and G and A | 1/1/3 | V |
| C and H and A | 0.5/1/1 | VI |

Polymer I, derived from monomers A and D, contains recurrent units of the structures $(CF_3)_2CF-O-(CH_2)_3-SiO_{1.5}$, and     VIII $CH_3-O-(CH_2-CH_2-O)_2-(CH_2)_3-SiO_{1.5}$     IX Polymer II, derived from monomers A and D and trichlorosilane, contains recurrent units of the structures shown in formulas VIII and IX plus $HSiO_{1.5}$.

Polymer III, derived from monomers A and E, contains recurrent units of the structure shown in formula VIII plus $CH_3-O-(CH_2-CH_2O)_g-(CH_2)_3-SiO_{1.5}$ wherein $g$ is approximately 12.

Polymer IV, derived from monomers A and F, contains recurrent units of the structure shown in formula VIII plus $O_{1.5}Si-(CH_2)_3-O-(CH_2-CH_2-O)_3-(CH_2)_3-SiO_{1.5}$.

Polymer V, derived from monomers A, B, and G, contains recurrent units of the structure shown in formula VIII plus $(CF_3)_2CFB-O-(CH_2)_3-Si(CH_3)O$, and

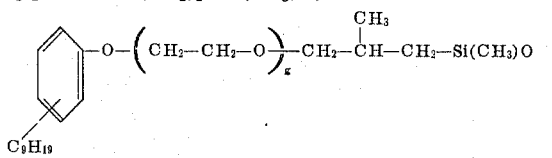

(wherein g is approximately 12)

Polymer VI, derived from monomers A, C, and H, contains recurrent units of the structure shown in formula VIII plus, $CF_3-(CF_2)_6-CH_2-O-(CH_2)_3SiO_{1.5}$, and

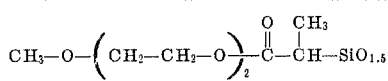

EXAMPLE 7—FABRIC TREATMENT

The fabrics used in the treatments were a triblend of wool/cotton/nylon and a triblend of wool-rayon/polyester.

Treatment of the fabrics with the copolymers of the invention were carried out by immersing the fabrics in a solution of the copolymer in trichlorotrifluoroethane or 1,3-bis-trifluoromethyl-benzene. In some cases the copolymer was applied as an aqueous emulsion. After immersion in the solution or emulsion, the fabrics were run through squeeze rolls to obtain a 50-60 percent wet pickup. The treated fabrics were then air-dried and cured in an oven at 100°-150° C. for 10-20 minutes. After removal from the oven and cooling to room temperature, the products were tested for oil repellency and for soil release as previously described. In some instances the fabrics, prior to application of the copolymers, were treated with dimethylol dihydroxyethylene urea (DMDEU) in order to impart durable press properties and to examine the effectiveness of the copolymers in the presence of this conventional finishing agent. The durable press fabrics were prepared as follows: A 20 percent aqueous solution of DMDEU containing approximately 0.5 percent $Zn(NO_3)_2$ catalyst and 0.2 percent of a nonionic detergent was prepared. Fabrics were immersed in this solution, then squeezed to a wet pickup of 40-50 percent. The fabric swatches were air-dried, pressed for 1 minute on a high-heat (350° F.) press and then cured in an oven at 325° F. for 15 minutes.

The following table summarizes the results of fabric treatment with the various copolymers described in example 6.

In certain cases, the copolymers were applied as aqueous emulsions. A typical example of emulsification follows: 10 grams of copolymer III was dissolved in 10 ml. of benzotrifluoride. To this was added 50 mg. of a commercial wetting agent (Igepal CO-530, a nonylphenoxy polyoxyethylene glycol containing six ethyleneoxy groups per molecule). This solution was added slowly to 80 ml. of water containing 50 mg. of a commercial wetting agent (Igepal CO-710, a nonylphenoxy polyoxyethylene glycol containing 12 ethyleneoxy groups per molecule) which was being stirred in a high-speed blender. The emulsion which resulted could be used as such or diluted further with water.

TABULATION OF RESULTS OF FABRIC TREATMENT

| Copolymer code No. and concentration in solution or emulsion | Cure conditions, temp. °C./time min. | Fabric* | Oil repellency | | Stain release rating |
| --- | --- | --- | --- | --- | --- |
| | | | Before washing | After washing | |
| I, 2% sol | 110/10 | W/C/N and DMDEU | 3 | 2 | 5 |
| I, 2% sol | 110/20 | W/C/N and DMDEU | 3 | 2 | 5 |
| II, 2% sol | 110/20 | W/R/P and DMDEU | 5 | 4 | 5 |
| III, 3% emul | 120/15 | W/C/N | 3 | 2 | 5 |
| IV, 3% sol | 110/30 | W/C/N | 2 | 2 | 4 |
| V, 1% sol | 150/3 | W/R/P | 2 | 1 | 4 |
| VI, 3% sol | 120/10 | W/R/P and DMDEU | 6 | 5 | 4 |
| None | | W/C/N and DMDEU | 0 | 0 | 2.5 |
| Do | | W/C/N | 0 | 0 | 3.0 |
| Do | | W/R/P | 0 | 0 | 2.0 |
| Do | | W/R/P and DMDEU | 0 | 0 | 1.0 |

*W/C/N=wool/cotton/nylon, W/R/P=wool/rayon/polyester, DMDEU=dimethylol dihydroxyethylene urea.

Hereinabove we have described a series of hydrophilic monomers. These compounds may be formed into homopolymers by applying conventional hydrolytic polymerization techniques such as those described above. We have observed that these homopolymers may be applied to fibrous materials to improve their soil release properties, however, the results are not as good as those obtained by application of the aforesaid copolymers with olephobic monomers. Of course, the homopolymers do not provide any resistance to oil staining. Taking these items into consideration, the homopolymers of the hydrophilic monomers are useful in situations where it is desired to render a fibrous material hydrophilic. They also exert a softening effect on the substrate so that they are also useful for that purpose. In a practice of this aspect of the invention, the homopolymers are applied to the fibrous substrate in the same manner as described above in connection with the copolymers, and subjected to the same curing step. The following examples illustrate the preparation of the homopolymers and their application to textile materials.

EXAMPLE 8—POLYMERIZATION OF MONOMER D

A 2ml. sample of monomer D was slowly added to 20 ml. of water. Heat was evolved during the addition. A somewhat cloudy solution resulted after completion of the addition.

A portion of the solution was placed on a glass evaporating dish and the water allowed to evaporate. A viscous polymeric siloxane was thus formed. Heating of this viscous polymer at 150° C. for 15 minutes gave a clear, rubbery, water-insoluble film.

EXAMPLE 9—POLYMERIZATION OF MONOMER E

This monomer was polymerized by adding 1 ml. of water to 5 ml. of the monomer dissolved in 25 ml. of tetrahydrofuran.

After stirring at room temperature for 1 hour, the solvent was removed under vacuum, leaving a thick water-soluble fluid polymer. This product could also be converted to a cross-linked, rubbery, water-insoluble film by heating above 100° C.

EXAMPLE 10—TREATMENT OF TEXTILE

The textile used in the following tests was a triblend fabric of wool/rayon/polyester which had been given a durable press treatment as follows: The fabric was immersed in a 20 percent aqueous solution of dimethylol dihydroxyethylene urea containing 0.5 percent zinc nitrate catalyst and 0.2 percent of a nonionic detergent. Following this the fabric was squeezed in a pad roll to a 60 percent wet pickup, air-dried, pressed for 1 minute in a hothead press (350° F.), then oven-cured at 325° F. for 15 minutes.

An aqueous solution of polymerized monomer E was prepared by adding 5 ml. of the monomer to 95 ml. of water. After the addition, the solution was brought to neutrality by adding 1 N sodium hydroxide. A swatch of the fabric was immersed in this solution, squeezed to 60 percent wet pickup, air-dried, and cured in an oven at 300° F. for 5 minutes.

The treated fabric and, as a control, a swatch of fabric which had not been treated with the polymer were then tested for stain releasability. To this end, the swatches were stained with mineral oil, washed, and rated for stain release according to AATCC Test Method 130–1969. Residual stain is rated on a scale from five to one by comparison with a standard stain-release replica which displays a graduated series of stains. The highest number (5) indicates complete stain removal whereas the lowest (1) indicates virtually no stain removal.

The results obtained were as follows: The sample treated with the polymer had a stain-release rating of 4, whereas the control had a rating of 1.5.

Having thus described our invention, we claim:

1. A process for modifying a fibrous substrate which comprises:
   I. applying to the fibrous substrate a siloxane copolymer which contains
      A. recurring units of the structure

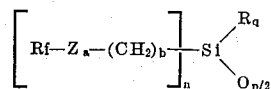

wherein
      $R_f$ is a perfluoroalkyl group containing three to 18 perfluorinated carbon atoms;
      Z is a divalent bridging group linked to a carbon of $R_f$ and a carbon of $(CH_2)_b$;
      R is a member of the group consisting of hydrogen, monovalent hydrocarbon radicals, and monovalent halohydrocarbon radicals;
      $a$ is an integer from 0 to 1;
      $b$ is an integer from 1 to 12;
      $n$ is an integer from 1 to 2;
      $p$ is an integer from 1 to 3;
      $q$ is an integer from 0 to 2; and
      the sum of $n$, $p$, and $q$ is 4; and
      B. recurring units of the structure

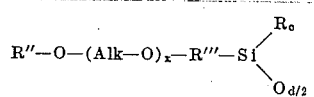

wherein:
      R'' is a monovalent hydrocarbon radical containing one to 20 carbon atoms;
      Alk is an alkylene group containing two to six carbon atoms;
      $x$ is an integer from 2 to 100;
      R''' is a divalent linking radical selected from the group consisting of —CH$_2$—CH$_2$—CH$_2$—, —CH$_2$—CH(CH$_3$)—CH$_2$—, —CO—CH(CH$_3$)—, and —CO—C(CH$_3$)$_2$—;
      R is a member of the group consisting of hydrogen, monovalent hydrocarbon radicals, and monovalent halohydrocarbon radicals;
      $c$ is an integer from 0 to 2;
      $d$ is an integer from 1 to 3; and
      the sum of $c$ and $d$ is 3;
   II. the said siloxane copolymer being applied as a dispersion in a volatile liquid carrier; and
   III. curing the so-treated fibrous substrate by heating it at a temperature about from 50° to 150° C.

2. The process of claim 1 wherein unit A has the structure
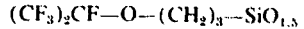

3. The process of claim 1 wherein unit A has the structure

4. The process of claim 1 wherein unit A has the structure
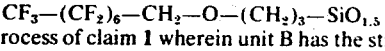

5. The process of claim 1 wherein unit B has the structure
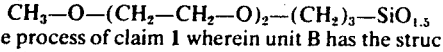

6. The process of claim 1 wherein unit B has the structure
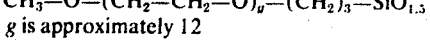
wherein $g$ is approximately 12

7. The process of claim 1 wherein unit B has the structure

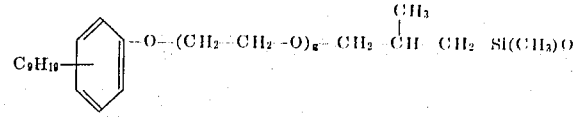

wherein $g$ is approximately 12

8. The process of claim 1 wherein unit B has the structure

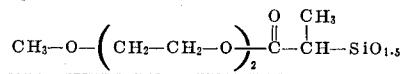

9. The process of claim 1 wherein unit B has the structure

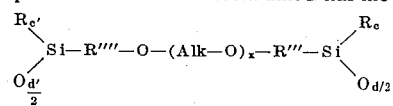

wherein:
   each R is a member of the group consisting of hydrogen, monovalent hydrocarbon radicals, and monovalent halohydrocarbon radicals;
   R''' is a member of the group consisting of —CH$_2$—CH$_2$—CH$_2$—, —CH$_2$—CH(CH$_3$)—CH$_2$—, —CO—CH(CH$_3$)—, and —CO—CH(CH$_3$)$_2$—;
   R'''' is a member of the group consisting of —CH$_2$—CH$_2$—CH$_2$—, —CH$_2$—CH(CH$_3$)—CH$_2$—, —(CH$_3$)CH—CO—, and —(CH$_3$)$_2$C—CO—;
   Alk is an alkylene radical containing two to six carbon atoms;
   $x$ is an integer from 2 to 100;
   $c$ is an integer from 0 to 2;
   $d$ is an integer from 1 to 3;
   the sum of $c$ and $d$ is 3;
   $c'$ is an integer from 0 to 2;
   $d'$ is an integer from 1 to 3; and
   the sum of $c'$ and $d'$ is 3.

10. The process of claim 1 wherein unit B has the structure
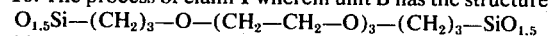

11. A process for modifying a fibrous substrate which comprises:
   I. applying to the fibrous substrate a siloxane homopolymer which contains recurring units of the structure

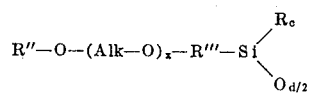

wherein:
   R'' is a monovalent hydrocarbon radical containing one to 20 carbon atoms;
   Alk is an alkylene group containing two to six carbon atoms;
   $x$ is an integer from 2 to 100;
   R''' is a divalent linking radical selected from the group consisting of —CH₂—CH₂—CH₂—, —CH₂—CH(CH₃)—CH₂—, —CO—CH(CH₃)—, and —CO—C(CH₃)₂—;

R is a member of the group consisting of hydrogen, monovalent hydrocarbon radicals, and monovalent halo-hydrocarbon radicals;

c is an integer from 0 to 2;

d is an integer from 1 to 3; and the sum of c;l and c d is 3;

II. the said siloxane homopolymer being applied as a dispersion in a volatile liquid carrier; and III. curing the so-treated fibrous material by heating it at a temperature about from 50° to 150° C.

12. The process of claim 11 wherein the unit has the structure

CH₃—O—(CH₂—CH₂—O)₂—(CH₂)₃—SiO₁.₅

13. The process of claim 11 wherein the unit has the structure

CH₃—O—(CH₂—CH₂—O)_g—(CH₂)₃—SiO₁.₅ wherein g is approximately 12

14. The process of claim 11 wherein the unit has the structure

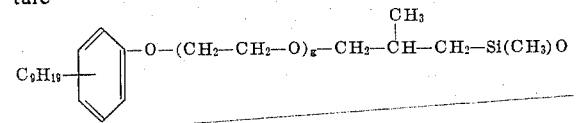

wherein g is approximately 12

15. The process of claim 11 wherein the unit has the structure

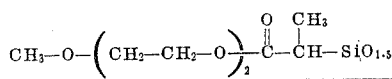

16. The process of claim 11 wherein the unit has the structure

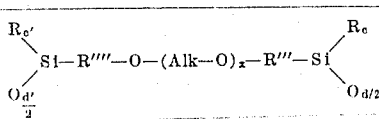

wherein:
each R is a member of the group consisting of hydrogen, monovalent hydrocarbon radicals, and monovalent halo-hydrocarbon radicals;

R''' is a member of the group consisting of —CH₂—CH₂—CH₂—, —CH₂—CH(CH₃)—CH₂—, —CO—CH(CH₃)—, and —CO—CH(CH₃)₂—;

R'''' is a member of the group consisting of —CH₂—CH₂—CH₂—, —CH₂—CH(CH₃)—CH₂—, —(CH₃)CH—CO—, and —(CH₃)₂C—CO—;

Alk is an alkylene radical containing two to six carbon atoms;

x is an integer from 2 to 100;

c is an integer from 0 to 2;

d is an integer from 1 to 3;

the sum of c and d is 3;

c' is an integer from 0 to 2, d' is an integer from 1 to 3; and the sum of c' and d' is 3.

17. The process of claim 11 wherein the unit has the structure

O₁.₅Si—(CH₂)₃—O—(CH₂—CH₂—O)₃—(CH₂)₃—SiO₁.₅

18. As an article of manufacture, a fibrous substrate carrying a deposit of a siloxane copolymer which contains A. recurring units of the structure

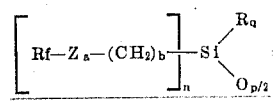

wherein:
R_f is a perfluoroalkyl group containing three to 18 perfluorinated carbon atoms;

Z is a divalent bridging group linked to a carbon of R_f and a carbon of (CH₂)_b;

R is a member of the group consisting of hydrogen, monovalent hydrocarbon radicals, and monovalent halo-hydrocarbon radicals;

a is an integer from 0 to 1, b is an integer from 1 to 12, n is an integer from 1 to 2, p is an integer from 1 to 3, q is an integer from 0 to 2; and the sum of n, p, and q is 4; and B. recurring units of the structure

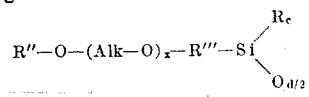

wherein:
R'' is a monovalent hydrocarbon radical containing one to 20 carbon atoms;

Alk is an alkylene group containing two to six carbon atoms;

x is an integer from 2 to 100;

R''' is a divalent linking radical selected from the group consisting of —CH₂—CH₂—CH₂—, —CH₂—CH(CH₃)—CH₂—, —CO—CH(CH₃)—, and —CO—C(CH₃)₂—;

R is a member of the group consisting of hydrogen, monovalent hydrocarbon radicals, and monovalent halo-hydrocarbon radicals;

c is an integer from 0 to 2;

d is an integer from 1 to 3; and the sum of c and d is 3.

19. The article of claim 18 wherein unit A has the structure (CF₃)₂CF—O—(CH₂)₃—SiO₁.₅

20. The article of claim 18 wherein unit A has the structure (CF₃)₂CF—O—(CH₂)₃—Si(CH₃)O 21. The article of claim 18 wherein unit A has the structure CF₃—(CF₂)₆—CH₂—O—(CH₂)₃—SiO₁.₅

22. The article of claim 18 wherein unit B has the structure

CH₃—O—(CH₂—CH₂—O)₂—(CH₂)₃—SiO₁.₅

23. The article of claim 18 wherein unit B has the structure

CH₃—O—(CH₂—CH₂—O)_g—(CH₂)₃—SiO₁.₅ wherein g is approximately 12

24. The article of claim 18 wherein unit B has the structure

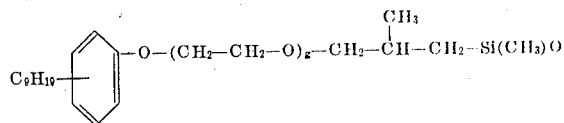

wherein g is approximately 12

25. The article of claim 21 wherein unit B has the structure

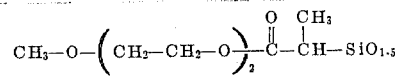

26. The article of claim 18 wherein unit B has the structure

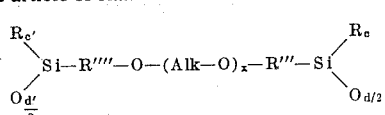

wherein:
each R is a member of the group consisting of hydrogen, monovalent hydrocarbon radicals, and monovalent halo-hydrocarbon radicals;

R''' is a member of the group consisting of —CH₂—CH₂—CH₂—, —CH₂—CH(CH₃)—CH₂—, —CO—CH(CH₃)—, and —CO—CH(CH₃)₂—;

R'''' is a member of the group consisting of —CH₂—CH₂—CH₂ to —, —CH₂—CH(CH₃)—CH₂—, —(CH₃)CH—CO—, and —(CH₃)₂C—CO—;

Alk is an alkylene radical containing two to six carbon atoms;

x is an integer from 2 to 100;

c is an integer from 0 to 2;

d is an integer from 1 to 3;

the sum of c and d is 3;

$c'$ is an integer from 0 to 2;
$d'$ is an integer from 1 to 3; and
the sum of $c'$ and $d'$ is 3.

27. The article of claim 18 wherein unit B has the structure
$O_{1.5}Si-(CH_2)_3-O-(CH_2-CH_2-O)_3-(CH_2)_3-SiO_{1.5}$ 28. As an article of manufacture, a fibrous substrate carrying a deposit of a siloxane homopolymer which contains recurring units of the structure

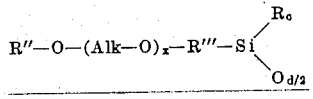

wherein:
R'' is a monovalent hydrocarbon radical containing one to 20 carbon atoms;
Alk is an alkylene group containing two to six carbon atoms;
$x$ is an integer from 2 to 100;
R''' is a divalent linking radical selected from the group consisting of $-CH_2-CH_2-CH_2-$, $-CH_2-CH(CH_3)-CH_2-$, $-CO-CH(CH_3)-$, and $-CO-C(CH_3)_2-$;
R is a member of the group consisting of hydrogen, monovalent hydrocarbon radicals, and monovalent halohydrocarbon radicals,
$c$ is an integer from 0 to 2;
$d$ is an integer from 1 to 3; and
the sum of $c$ and $d$ is 3.

29. The article of claim 28 wherein the unit has the structure
$CH_3-O-(CH_2-CH_2-O)_2-(CH_2)_3-SiO_{1.5}$ 30. The article of claim 28 wherein the unit has the structure
$CH_3-O-(CH_2-CH_2-O)_g-(CH_2)_3-SiO_{1.5}$
wherein $g$ is approximately 12

31. The article of claim 28 wherein the unit has the structure

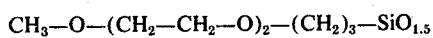

32. The article of claim 28 wherein the unit has the structure

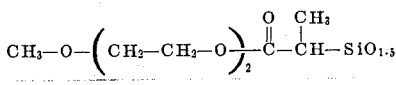

33. The article of claim 28 wherein the unit has the structure

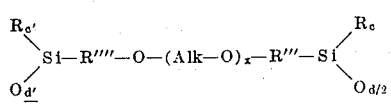

wherein:
each R is a member of the group consisting of hydrogen, monovalent hydrocarbon radicals, and monovalent halohydrocarbon radicals;
R''' is a member of the group consisting of $-CH_2-CH_2-CH_2-$, $-CH_2-CH(CH_3)-CH_2-$, $-CO-CH(CH_3)-$, and $-CO-CH(CH_3)_2-$;
R'''' is a member of the group consisting of $-CH_2-CH_2-CH_2-$, $-CH_2-CH(CH_3)-CH_2-$, $-(CH_3)CH-CO-$, and $-(CH_3)_2C-CO-$;
Alk is an alkylene radical containing two to six carbon atoms;
$x$ is an integer from 2 to 100;
$c$ is an integer from 0 to 2;
$d$ is an integer from 1 to 3;
the sum of $c$ and $d$ is 3;
$c'$ is an integer from 0 to 2;
$d'$ is an integer from 1 to 3; and
the sum of $c'$ and $d'$ is 3.

34. The article of claim 28 wherein the unit has the structure
$O_{1.5}Si-(CH_2)_3-O-(CH_2-CH_2-O)_3-(CH_2)_3-SiO_{1.5}$

* * * * *